United States Patent [19]

Bender

[11] Patent Number: 5,427,612

[45] Date of Patent: Jun. 27, 1995

[54] PHENOLIC-RESIN-MODIFIED NATURAL RESIN ACID ESTERS, PROCESSES FOR THEIR PREPARATION AND THEIR USE IN PRINTING INKS

[75] Inventor: Albert Bender, Mainz, Germany

[73] Assignee: Hoechst Aktiengesellschaft, Germany

[21] Appl. No.: 214,952

[22] Filed: Mar. 14, 1994

[30] Foreign Application Priority Data

Mar. 15, 1993 [DE] Germany .................. 43 08 109.6

[51] Int. Cl.[6] .................... C09D 11/08; C09D 11/06
[52] U.S. Cl. ............................ 106/30 C; 106/30 R; 106/218; 106/219; 106/220; 106/237
[58] Field of Search ............ 106/218, 219, 237, 30 R, 106/30 C, 220; 101/450.1, 287

[56] References Cited

U.S. PATENT DOCUMENTS

| | | | |
|---|---|---|---|
| 3,531,302 | 9/1970 | Horn | 106/219 |
| 3,880,788 | 4/1975 | Rudolphy | 106/218 |
| 4,079,102 | 3/1978 | Wagner et al. | 106/20 R |
| 4,116,905 | 9/1978 | Davis | 106/219 |
| 4,165,304 | 8/1979 | Davis | 106/219 |
| 4,198,329 | 4/1980 | Rudolphy et al. | 106/30 C |
| 4,528,036 | 7/1985 | Rudolphy | 106/30 C |
| 4,552,592 | 11/1985 | Rudolphy et al. | 106/30 C |
| 4,597,793 | 7/1986 | Amon et al. | 106/21 C |

FOREIGN PATENT DOCUMENTS 2-64182  3/1990  Japan .................. 106/218

*Primary Examiner*—Anthony Green
*Attorney, Agent, or Firm*—Bierman and Muserlian

[57] ABSTRACT

Phenolic-resin-modified natural resin acid esters obtained by reaction of
 A) natural resins or natural resin acids,
 B) mononuclear or polynuclear alkylolizable phenols,
 C) aldehydes or aldehyde acetals,
 D) aliphatic, cycloaliphatic or araliphatic polyols,
 E) magnesium compounds,
 F) if appropriate, fatty acids or fatty acid compounds and
 G) if appropriate, ethylenically unsaturated hydrocarbon resins,
at a temperature of 100° to 250° C. and subsequent azeotropic removal of the water by distillation by means of an entraining agent at 200° to 300° C.

6 Claims, No Drawings

PHENOLIC-RESIN-MODIFIED NATURAL RESIN ACID ESTERS, PROCESSES FOR THEIR PREPARATION AND THEIR USE IN PRINTING INKS

The invention relates to novel, oil-soluble, phenolic-resin-modified natural resin acid esters which have high molecular weights and therefore high solution viscosities in mineral oil, coupled with a compatibility which is still good, and to a process for their preparation from natural resins, phenols, aldehydes and esterifying and modifying agents, this process being distinguished by short reaction times. The novel compounds can advantageously be used as binder resins for offset printing inks.

As is known, offset printing inks can be prepared by pigmenting a varnish, it being possible for the varnish to be obtained by dissolving suitable binder resins in mineral oil with addition of various auxiliaries. Possible auxiliaries are, for example, vegetable oils, alkyd resins, waxes and, if appropriate, other additives for improving the binder properties, for example the gloss and the abrasion resistance of the print film. The binder resin here has the task of anchoring the pigment to the printed material. The development of particularly high-speed printing machines and the trend toward also printing non-coated papers of increased absorbency to an increased extent, in addition to coated papers, imposes particularly high requirements on the quality of these binder resins. In particular, they must impart to the color film a good status on the printed material. Under no circumstances should binder resins diffuse into the inside together with pigment, since this is accompanied by a loss of gloss and impaired abrasion resistance. It is known that binder resins of high molecular weight are of advantage, since they have diminished absorption properties in the printed material.

If binder resins based on natural resin acid are used, they must be modified in a suitable manner in order to build up molecular weight. It is known that it is not sufficient to react the natural resin acids only with polyols, since the resulting molecular weights are still too low for advantageous use. An increase can be achieved, however, if the products are additionally modified with phenol/aldehyde condensation products. According to the prior art, however, a further improvement is achieved if the natural resin acids are reacted with $\alpha,\beta$-ethylenically unsaturated carboxylic acids or anhydrides thereof before the modification with phenolic resin. Fumaric acid, maleic acid, maleic anhydride, itaconic acid, cinnamic acid, acrylic acid or methacrylic acid, for example, are known. Maleic anhydride is preferably used. In the reaction with the natural resin, the monofunctional acids contained therein, such as, for example, pimaric, abietic and neoabietic acid, are converted into an acid with three acid functions, so-called maleopimaric acid. This is now particularly suitable for crosslinking with polyols, which leads to high molecular weights. Nevertheless, a prerequisite for molecular weight build-up is as complete as possible a reaction of the acid groups. Acid numbers which are below 25 mg of KOH/g of resin are typically sought. As is known, relatively long reaction times at high temperatures are then required for this polycondensation reaction, which is a disadvantage for industrial preparation because of the low time yield. It is a further disadvantage that polar groups, which can reduce the desired compatibility with the mineral oil on which the ink is based, are additionally introduced into the binder resin by the unsaturated carboxylic acids. In order to prevent the binder resin from then precipitating out of the solution, solubilizing agents, for example, vegetable oils or alkyd resins or long-chain, high-boiling alcohols can also be used. On the other hand, however, additives of this type can lead to adverse delays in drying in the print film.

The present invention was thus based on the object of providing synthetic resins which are prepared without co-using $\alpha,\beta$-ethylenically unsaturated carboxylic acid derivatives, but nevertheless have a high molecular weight and therefore high solution viscosities, also coupled with a compatibility with mineral oil which is still good, and require only a short reaction time for their preparation.

It has now been found, surprisingly, that synthetic resins which have these properties and are suitable as binder resins for the preparation of offset printing inks can be obtained by a process in which, in the preparation of offset printing ink resins based on phenolic-resin-modified natural resin acid esters, magnesium compounds are used as a catalyst for the resol formation from phenols and aldehydes in the natural resin melt and for the natural resin acid esterification, and the water formed during the condensation reaction and natural resin acid esterification is removed by azeotropic distillation, with the additional use of an inert organic solvent capable of forming an azeotrope with water. The synthetic resins which result here display high solution viscosities and good compatibilities with mineral oils and can be prepared in a considerably shorter reaction time than comparable resins modified with $\alpha,\beta$-ethylenically unsaturated carboxylic acid derivatives.

The invention therefore relates to phenolic-resin-modified natural resin acid esters which have high solution viscosities in mineral oil, coupled with a compatibility which is still good, and can be prepared in short reaction times, substance groups by reaction of at least one compound of each of the A) natural resins or natural resin acids,
B) mononuclear or polynuclear alkylolizable phenols,
C) aldehydes or aldehyde acetals and
D) aliphatic, cycloaliphatic or araliphatic alcohols, having at least two hydroxyl groups, in the presence of
E) magnesium compounds and, if appropriate, further compounds selected from the substance groups comprising
F) fatty acids or fatty acid compounds and
G) ethylenically unsaturated hydrocarbon resins, at a temperature of 100° to 250° C. and subsequent azeotropic removal of the water by distillation by means of an entraining agent at 200° to 300° C.

In the preparation of the novel phenolic-resin-modified natural resin acid esters, it is particularly important for a magnesium compound to be used as a condensation catalyst in the first process stage and, in the second process stage, for an inert organic solvent capable of azeotropic distillation of water at the reaction temperature to be used as an entraining agent for azeotropic distillation of the water of reaction and for the water of reaction to be removed from circulation and eliminated by continuous azeotropic distillation from the reaction mixture. Only the combination of the two measures leads, surprisingly, to the increase in molecular weight and viscosity of the binder resin and to the shortening of its reaction time, while the object according to the invention is not achieved by the individual use of in each case only one of these measures. With the combined use according to the invention of azeotropic distillation using the metal compounds mentioned, a synergistic effect which was neither known nor foreseeable and therefore was highly surprising and unexpected is accordingly evidently achieved.

The proportion of the individual components, including the entraining agent, based on the total amount of all the components, is preferably

- 20 to 80% by weight, preferably 30 to 75% by weight, in particular 35 to 60% by weight, of natural resins or natural resin acids from substance group A),
- 10 to 45% by weight, preferably 15 to 40% by weight, in particular 20 to 35% by weight, of phenolic components from substance group B) and
- 2 to 20% by weight, preferably 3 to 10% by weight, in particular 5 to 8% by weight, of aldehyde components from substance group C),
- or, if appropriate, instead of the components from substance groups B) and C) or as a proportion with these, up to 65% by weight of condensation products, in a phenol-resol form, prepared separately from compounds of substance groups B) and C),
- 1 to 20% by weight, preferably 3 to 15% by weight, in particular 4 to 10% by weight, of polyol components from the substance group D),
- 0.01 to 2% by weight, preferably 0.3 to 1% by weight, in particular 0.4 to 0.8% by weight, calculated as MgO, of magnesium compounds from substance group E),
- 0 to 30% by weight, preferably 3 to 15% by weight, in particular 5 to 10% by weight, of fatty acid components from the substance group F),
- 0 to 30% by weight, preferably 1 to 25% by weight, in particular 2 to 10% by weight, of hydrocarbon resin components from the substance group G), and
- 0.01 to 20% by weight, preferably 3 to 15% by weight, in particular 4 to 10% by weight, of inert entraining agent.

Preferred possible compounds of substance groups A) to G) are:

A) Natural resins or natural resin acids, in particular colophony (tree resin), root resin, tall resin and natural resins which are partly hydrogenated, disproportionated or dimerized. The resins and resin acids have, where appropriate, a bromine number (equals amount of bromine absorbed in g per 100 g of resin) in the range of preferably 200 to 280 and an acid number in the range of preferably 100 to 200 mg of KOH/g of resin.

B) Mononuclear or polynuclear phenols, preferably those which are polyfunctional toward oxo compounds, in particular phenol, $(C_1-C_{12})$-alkylphenols, aryl- or aralkylphenols, cresols, 1,3,5-xylenols, isopropyl-, p-tert-butyl-, amyl-, octyl- and nonylphenol, diphenylolpropane, phenylphenol, cumylphenol and addition products of phenols and ethylenically unsaturated monomers, preferably styrene, α-methylstyrene, α-chlorostyrene, vinyltoluene and cyclopentadiene. Preferred phenols are mono- and bifunctional, in particular bifunctional, phenols, those in which one or two of the ortho or para positions relative to the phenolic OH group on the benzene ring are reactive and are capable of aldehyde addition. Trifunctional phenols, for example, phenol, or tetrafunctional phenols, for example, diphenylolpropane, can also be used. The desired compatibilities of the resins according to the invention with aliphatic hydrocarbons and mineral oils can be achieved very advantageously with the particularly preferred bifunctional phenols, the alkyl- and aralkylphenols. The known reaction products are trifunctional phenols with ethylenically unsaturated monomers furthermore have an advantageous effect in the same manner, so that these reaction products are also preferred phenol components. Particularly preferred difunctional phenols are tert-butyl-, octyl- and nonylphenol. On the other hand, particularly high molecular weights and therefore high solution viscosities can be established with the tri- or tetrafunctional phenols. Their co-use in the preparation of high-viscosity binder resins which still have a good compatibility with mineral oil is therefore a particularly preferred embodiment of the process according to the invention. They are then employed in minor proportions together with mono- and/or difunctional phenols, in which case the proportion of tri- or tetrafunctional phenols should preferably be not more than 40% by weight, based on the total amount of phenols employed.

In a specific, less preferred embodiment, however, it is also possible to increase the proportion of tri- or tetrafunctional phenols, and even to employ them as the sole phenols in the reaction according to the invention. Very high molecular weight binder resins with a high solution viscosity but poor compatibility with mineral oil are then obtained. However, such binder resins can be used as overprinting lacquers or gloss varnishes, for example after boiling with linseed oil.

C) Aldehydes or aldehydeacetals, preferably aliphatic $(C_1-C_7)$-aldehydes, in particular formaldehyde in its various monomeric, oligomeric and polymeric forms, acetaldehyde, butyraldehyde, isobutyraldehyde and furthermore benzaldehyde, furfural, glyoxal and phenolresols prepared from components of substance groups B) and C).

The molar ratio of the phenol component from B) to the aldehyde component from C) for the phenol-resol formation can be varied within wide limits, and is preferably in the range from 1:0.9 to 1:4.5, in particular 1:1 to 1:3.5.

Excess or unreacted aldehyde is removed from the reaction mixture, preferably by distillation. The solution viscosity and mineral oil compatibility of the phenol-resin-modified natural resin acid esters obtained as end products and prepared according to the invention can be influenced or controlled conveniently by the nature and amount of starting components used for the phenol-resol resin formation, and the proportion of phenolic resin components in the end product can preferably be up to 65%, based on the end product.

The phenol-resol resin formation can also be carried out separately by known methods from phenol and aldehydes and basic catalysts at temperatures of between 50° and 160° C., preferably 60° to 100° C., under normal pressure or increased pressure in an autoclave, and the product can then be added to the natural resin melt or natural resin acid melt according to the invention, instead of corresponding amounts of phenol components from substance group B) and aldehyde components from substance group C). However, phenol-resol resin formation from phenol components and aldehyde components in situ in the natural resin melt or natural resin acid melt is preferred.

D) All compounds known from polyester resin preparation and containing several hydroxyl groups can be used as esterifying agents, preferably polyfunctional alcohols. Glycerol, trimethylolpropane and pentaerythritol are particularly preferred.

E) Magnesium compounds are absolutely essential as condensation catalysts. The oxides and hydroxides or salts of weak organic acids, in particular the carbonates, bicarbonates, acetates, formates and oxalates, are preferred.

Zinc compounds or calcium compounds can also be co-used in minor proportions of up to not more than ⅓ equivalent, based on the number of equivalents of the magnesium compound employed. If calcium compounds or zinc compounds are used by themselves, without simultaneous use of magnesium compounds, the end products resulting during preparation of the resin by azeotropic distillation can undergo changes which no longer lead to products according to the invention. For example, they undergo only an inadequate increase in molecular weight and viscosity, or products having too poor a compatibility with mineral oil are obtained. These differences in the activity of the various metal compounds which are usually used for binder resin preparation for printing inks, and their influence on the build-up of the polycondensates, are exceptionally surprising.

F) Animal or vegetable fatty acids or fatty acids obtained by refining or fatty acid compounds are preferably used as fatty acids. The iodine number (equals amount of iodine absorbed in g per 100 g of fat) of these compounds can preferably be up to 150, so that non-drying, semi-drying and drying oils and fats are suitable.

The proportion of fatty acid components participating, where appropriate, in the resin synthesis reaction according to the invention, based on the end products according to the invention resulting from the resin synthesis, can preferably be up to 30% by weight. Preferred fatty acid components are, for example, hydrogenated coconut fat, coconut fat, palm oil, Shea butter, Japanese wax, groundnut oil, olive oil, sulfocarbon oil, castor oil, rice oil, cotton seed oil, maize oil, beet oil, soya bean oil, linseed oil, sunflower oil, wood oil, tallow, spermaceti, train oil, wool fat, refined fatty acids, tall oil, dehydrated castor oil, epoxidized soya oil, polymerized oils, such as, for example, the so-called linseed oil stand oils, dimerized or trimerized fatty acids, hydroxystearic acid, isononoic acid or mixtures of these components.

G) Suitable ethylenically unsaturated hydrocarbon resins are those in which the macromolecules comprise isoprene, cyclopentadiene, dicyclopentadiene, coumarone, indene and styrene units. Their co-use according to the invention in the resin synthesis serves, where appropriate, to influence the end products according to the invention with respect to a lower absorption of water of the inks formulated with these products, the hydrocarbon resins being co-used, where appropriate, in amounts of preferably up to 30% by weight, based on the end product. It is also possible to employ the compounds of substance group G) or their monomers in the form of copolymers with the compounds of substance group A).

The products according to the invention are prepared in two stages. In the first stage, a mixture of components A) to E), if appropriate together with components F) and G), is reacted at a temperature of 100° to 250° C., preferably 110°0 to 160° C., preferably under a pressure of 1 to 10 bar, in particular 1 to 5 bar.

In the second reaction stage, the water of reaction formed is distilled off azeotropically with an inert entraining agent. Preferred possible inert entraining agents are saturated aliphatic or aromatic hydrocarbons, the boiling points of which under normal pressure are preferably above 100° C., for example alkanes, in particular hexane or decane, mixtures of aliphatic hydrocarbons, such as are present, for example, in gasoline or in corresponding mineral oil fractions, and furthermore preferably toluene or xylene. The entraining agent is preferably added to the reaction mixture via an inlet tube at the base of the reaction vessel. Small amounts of entraining agent can also already be added in the first stage of the synthesis process in order to lower the melt viscosity of the starting components. Preferably, the entire amount of entraining agent is added at the latest when a reaction temperature of 200° C. is reached. The azeotropic distillation is carried out at temperatures of 200° to 300° C., preferably 220° to 270°0 C., in particular 240° to 260° C., and under a pressure of 1 to 10 bar. The procedure under normal pressure is particularly preferred.

It is particularly important for the water of reaction formed during the condensation reaction to be removed continuously and completely from the reaction mixture by azeotropic distillation by means of this entraining agent, the entraining agent preferably being passed in circulation, and for the entraining agent to be distilled off from the reaction mixture again when the removal of water has ended. If this condition of continuous and exclusively azeotropic removal of the water of reaction from the circulation is not met consistently, the desired properties of the end product and the advantage of the shortening of the reaction time may be partly or completely lost.

The progress of the condensation reaction in the synthesis process is monitored with the aid of the acid number of the reaction mixture. The acid number of the resin mixture can thus initially preferably be up to 200 mg of KOH/g of resin, determined by the customary methods. As the reaction progresses, it drops continuously, with elimination of water and azeotropic removal of water from the circulation, and the esterification reaction is continued until the reaction according to the invention has reached the desired end state and the acid number has fallen to values of less than 50, preferably less than 30 mg of KOH/g of resin. Thereafter, the entraining agent is removed from the reaction product by distillation, finally in vacuo. This is in general effected initially under normal pressure and finally in vacuo under pressures of between 1000 and 0.1 mbar, preferably 200 to 50 mbar, and at temperatures of up to 300° C., preferably up to 280° C. In some cases, it may also be advantageous to leave the entraining agent or a proportion thereof in the end product if it dissolves in the end product without problems and does not interfere with or impair further use thereof. This can preferably be the case with very high molecular weight resins of high melting point, the processability of which can be improved considerably by such a measure in that their melt viscosity and melting point are reduced and a faster solubility in mineral oil is rendered possible.

The resins according to the invention can also be worked further after the actual reactions, in that additional compounds are added.

For example, dilution of the resin melt with mineral oil is possible, all possibilities from a solid via a liquid resin/mineral oil varnish to solution existing. On the other hand, however, it is also possible to add low molecular weight compounds, such as colophony, colophony esters, vegetable oils or polymers, such as alkyd resins, phenolic resins, polystyrene or mixtures thereof, to optimize the solution viscosities or compatibilities sought.

The preparation of the binder resins according to the invention by azeotropic distillation in combination with magnesium compounds as condensation catalysts can cause a ten-fold increase in the molecular weight, a two hundred-fold increase in viscosity and a halving of the reaction time in comparison with the process of the prior art. If binder resins which have comparable use properties, such as acid number, molecular weight, viscosity and mineral oil compatibility, to the binder resins of the process according to the invention are prepared by processes of the prior art by modification with $\alpha,\beta$-ethylenically unsaturated carboxylic acid derivatives, the latter require a significantly reduced reaction time for their preparation. This can be up to 50% below that of these products modified with the acid derivatives. It is furthermore even possible to prepare binder resins having an even higher viscosity than that shown by those compounds and in a shorter reaction time than corresponds to the prior art to date with the aid of the process according to the invention. These results were not foreseeable and are therefore exceptionally surprising. The preparation of the novel products according to the invention on an industrial scale thus proves to be exceptionally favorable, since very advantageous properties and time yields result in comparison with the prior art.

The molecular weight of the resins according to the invention can be determined by gel permeation chromatography of the resin solutions in tetrahydrofuran (THF) on polystyrene gel in a permeation measuring apparatus by known methods. The molecular weight (weight-average $M_w$) of the resins according to the invention, according to the measurement results obtained, preferably has values of $M_w$ greater than 5000 and has no critical upper limit. However, the molecular weights $M_w$ are particularly preferably in an average range of between 5000 and 100,000, in particular 8000 to 50,000.

The resins according to the invention have a good compatibility in mineral oil. To determine the mineral oil compatibility or clear solubility in mineral oil of the resins according to the invention, these are in each case dissolved at 180° C. in standardized mineral oil (boiling range 240° to 270° C., aniline point 72° C.) to give 35% strength by weight clear resin solutions, and the solutions are cooled to 23° C. and at the same time titrated with the same mineral oil, while stirring, until turbidity occurs (turbidity point). The ratio of 1 part by weight of resin to X parts by weight of mineral oil present in the solution at the turbidity point is called the compatibility or clear solubility end point.

If other mineral oils are used instead of the standardized test oil used here (equals mineral oil PKW F 4/7 from Haltermann, boiling range 240° to 270° C., aniline point 72°0 C.), the numerical values found for the mineral oil compatibility may vary.

To determine the viscosities, the 35% strength by weight mineral oil solutions or the linseed oil solutions which can be prepared in an analogous manner are measured in a customary rotary viscometer.

The invention furthermore relates to the use of the resins according to the invention as binder resins, preferably in printing inks for offset printing and letterpress printing, in which they can be very advantageously employed in particular in gel form as gel varnishes. The gel varnishes are preferably prepared by reaction of the binder resins with aluminum compounds, for example, aluminum alcoholate, or with acetoacetic acid esters of stabilized aluminum alcoholate by known procedures in high-boiling mineral oil. If appropriate, the gel varnishes are mixed with further binder resins, for example, phenolic-resin-modified colophony resins, vegetable oils, waxes, fillers, siccative and other additives, and pigmenting gives the printing inks which can be used for offset printing and letterpress printing, which prove to be, inter alia, largely insensitive in their viscosity properties in a very wide range at the variations in operating temperature which occur in printing machines, and also not insoluble, which is exceptionally advantageous.

Because of their good compatibility with aliphatics, the novel phenolic-resin-modified colophony resins according to the invention can also be employed in combination with low-boiling gasoline fractions such as are used, for example, in illustration gravure printing with gasoline. This wide applicability of the novel compounds for such different printing processes as offset, letterpress and gravure printing is an especially important advantage. The invention therefore furthermore relates to the use of the resins according to the invention as binder resins in printing inks for illustration gravure printing with gasoline.

The invention is illustrated in more detail by the following examples.

COMPARISON EXAMPLE 1

A binder resin is prepared by known processes without maleic anhydride and under the action of magnesium oxide. A low-viscosity resin is obtained.

527 g of commercially available colophony, which is also called natural resin or natural resin acid, 218 g of nonylphenol, 30 g of diphenylolpropane and 48 g of glycerol are melted in a heatable 2 liter multi-necked flask with a stirrer, thermometer, dropping funnel, reflux condenser and filling tube under a nitrogen atmosphere. 6 g of magnesium oxide, which corresponds to a content of 0.67% by weight, based on the total weight, suspended in 30 ml of xylene, are then added dropwise to the hot melt at 100° C., and 68 g of paraformaldehyde are then introduced. The mixture is then homogenized for 30 minutes, whilst stirring. The heating is then adjusted to a temperature of 130° C., water starting to condense in the reflux condenser. After two hours, the condenser is replaced by a descending condenser and the water, xylene and resin oil are distilled off. During this procedure, the temperature is increased to 250° C. and the progress of the reaction is determined with the aid of the acid number of the product. As soon as this has fallen to 25 mg of KOH/g of resin, volatile fractions are distilled off in vacuo under 100 mbar. After pressure compensation with nitrogen, the melt is drained, 801 g of a brittle, pulverizable resin being obtained after cooling. The resin has a softening point of 125° C. A 35% strength solution in mineral oil of boiling range 240° to 270° C. and aniline point 72° C. has a viscosity of 10 dPa.s, and a 35% strength solution in linseed oil at a viscosity of 101 dPa.s. A solution of 1 part of resin in 10 parts of the above mineral oil gives a stable, clear solution. This means that the compatibility of the resin is better than 1:10. The average molecular weight, determined by gel permeation chromatography, is 10,700. The reaction time for its preparation is 18 hours.

EXAMPLE 1

Preparation of a binder resin according to the invention by azeotropic distillation using the recipe of Comparison Example 1, a high-viscosity product of good compatibility with mineral oil and shorter reaction time being obtained.

527 g of commercially available colophony, which is also called natural resin or natural resin acid, 218 g of nonylphenol, 30 g of diphenylolpropane and 48 g of glycerol are melted in a heatable 2 litre multi-necked flask with a stirrer, thermometer, dropping funnel, reflux condenser and filling tube under a nitrogen atmosphere. 6 g of magnesium oxide, which corresponds to a content of 0.67% by weight, based on the total weight, suspended in 30 ml of xylene, are then added dropwise to the hot melt at 100° C., and 68 g of paraformaldehyde are then introduced. The mixture is then homogenized for 30 minutes, while stirring. The heating is then adjusted to a temperature of 130° C., water starting to condense in the reflux condenser. After two hours, the condenser is combined with an azeotropic water separator and the water is distilled off in circulation with xylene. During this operation, the temperature is increased continuously to 250° C., a further 50 g of xylene being added when 200° C. is reached. Water is constantly distilled off as an azeotrope with xylene during this operation. The progress of the reaction is determined with the aid of the acid number of the product. As soon as this has fallen to 25 mg of KOH/g of resin, the elimination of water has largely ended. The solvent in the melt is distilled off for 30 minutes, initially under normal pressure. Volatile fractions are distilled off in vacuo for 10 minutes under 100 mbar. After pressure compensation with nitrogen, the melt is drained, 805 g of a brittle, pulverizable resin being obtained after cooling. The resin has a softening point of 125° C. A 35% strength solution in mineral oil of boiling range 240° to 270° C. and aniline point 72° C. has a viscosity of 1790 dPa.s, and a 35% strength solution in linseed oil has a viscosity of 2530 dPa.s. A solution of 1 part of resin in 10 parts of the above mineral oil gives a stable, clear solution. This means that the compatibility of the resin is better than 1:10. The average molecular weight, determined by gel permeation chromatography, is 35,800. The reaction time for its preparation is 9 hours.

COMPARISON EXAMPLE 2

Preparation of a binder resin using the recipe and process of Example 1, magnesium oxide being replaced by the equivalent amount of zinc oxide. A product of inadequate compatibility with mineral oil and low viscosity is obtained.

12 g of zinc oxide, which corresponds to a content of 1.34% by weight, based on the total recipe, are employed. After a reaction time of 9 hours, 803 g of a brittle, pulverizable resin having a softening point of 122° C. and an acid number of 28 mg KOH/g of resin are obtained. A 35% strength solution in mineral oil of boiling range 240° to 270° C. and aniline point 72° C. has a viscosity of 165 dPa.s. A solution of 1 part of resin in 2.5 parts of the above mineral oil gives a cloudy solution at 23° C., which is unstable. The average molecular weight, determined by gel permeation chromatography, is 37,100.

COMPARISON EXAMPLE 3

Preparation of a binder resin using the recipe of Example 1, magnesium oxide being replaced by the equivalent amount of calcium oxide. A product of inadequate compatibility with mineral oil is obtained.

8.31 g of calcium oxide, which corresponds to a content of 0.93% by weight, based on the total recipe, are employed. After the reaction time of 9 hours, 805 g of a brittle, pulverizable resin having a softening point of 112° C. and an acid number of 26 mg KOH/g of resin are obtained. A solution of 1 part of resin in 1.5 parts of the above mineral oil already gives a cloudy solution at 23° C., i.e. this solution is unstable. A 35% strength solution of the resin in the mineral oil used above which is stable at 23° C. thus also cannot be prepared. The average molecular weight, determined by gel permeation chromatography, is 25,000.

The resin is unusable for an application according to the invention.

EXAMPLE 2

Preparation of a binder resin according to the invention by azeotropic distillation a resol and gasoline being used as the entraining agent.

A resol is first prepared from 1860 g of nonylphenol, 1380 g of 37% strength aqueous formaldehyde and 513 g of 33% strength sodium hydroxide solution in 850 g of xylene by known processes. The alkaline solution is neutralized with 470 g of 50% strength sulfuric acid and the resol is freed from the aqueous phase (solids content 68%, viscosity at 23° C. 200–300 mPa.s).

527 g of commercially available colophony, 48 g of glycerol and 6 g of magnesium oxide are heated at 160° C. in a heatable 2 litre multi-necked flask with a stirrer, thermometer, dropping funnel, descending condenser and filling tube under a nitrogen atmosphere. 505 g of the resol are then added dropwise to the hot melt in the course of half an hour, water distilling off. The temperature is then increased to 250° C., the descending condenser being replaced by a water separator and 50 g of gasoline of boiling range 140°–200° C. being introduced via an inlet tube which reaches down to the base of the reaction vessel when a temperature of 200° C. is reached. During this operation, the water is distilled off as an azeotrope with the circulating agent. The progress of the reaction is determined with the aid of the acid number of the product. As soon as this has fallen to 25 mg of KOH/g of resin, and the splitting off of water has largely ended, the solvent in the melt is distilled off in the course of 30 minutes, initially under normal pressure. Volatile contents are distilled off in vacuo in the course of 10 minutes under 100 mbar. After pressure compensation with nitrogen, the melt is drained, 825 g of a brittle, pulverizable resin which has a softening point of 125° C. being obtained after cooling. A 35% strength solution in mineral oil of boiling range 240°0 to 270° C. and aniline point 72° C. has a viscosity of 9 dPa.s, and a 35% strength solution in linseed oil has a viscosity of 160 dPa.s. A solution of 1 part of resin in 10 parts of the above mineral oil gives a stable, clear solution. This means that the compatibility of the resin is better than 1:10. The average molecular weight, determined by gel permeation chromatography, is 9560. The reaction time is 7 hours.

In a low-boiling gasoline fraction of boiling range 110° to 125° C., such as is used for gravure printing with gasoline, the resin has a viscosity of 760 mPa.s as a 50% strength solution at 23° C.

COMPARISON EXAMPLE 4

Preparation of a binder resin using maleicanhydride by known processes, a high-viscosity product which has a good compatibility with mineral oil but requires a long reaction time being obtained.

527 g of commercially available colophony are melted in a heatable 2 litre multi-necked flask with a stirrer, thermometer, dropping funnel, reflux condenser and filling tube under a nitrogen atmosphere, and 31 g of maleic anhydride are added at 160° C. After the exothermic reaction has subsided, the mixture is allowed to afterreact for a further hour. 71 g of pentaerythritol, 6 g of magnesium oxide (corresponds to a content of 0.6% by weight, based on the total recipe) and 276 g of nonylphenol are then added, the mixture is cooled to 110° C., and 68 g of paraformaldehyde are added. The mixture is then homogenized for 30 minutes, while stirring. The heating is then adjusted to a temperature of 130° C., water starting to condense in the reflux condenser. After 2 hours, the condenser is replaced by a descending condenser and the water and resin oil are distilled off. During this operation, the temperature is increased to 270° C., and the progress of the reaction is determined with the aid of the acid number of the product. As soon as this has fallen to 25 mg of KOH/g of resin, volatile fractions are distilled off in vacuo at 100 mbar in the course of one hour. After pressure compensation with nitrogen, the melt is drained, 845 g of a brittle, pulverizable resin being obtained after cooling. The resin has a softening point of 137° C. and an acid number of 19 mg of KOH/g of resin. A 35% strength solution in mineral oil of boiling range 240° to 270° C. and aniline point 72° C. has a viscosity of 425 dPa.s, and a 35% strength solution in linseed oil has a viscosity of 760 dPa.s. The mineral oil compatibility with the oil used above is 1:7.5. The average molecular weight, determined by gel permeation chromatography, is 28,400 and the reaction time for its preparation is 18 hours.

EXAMPLE 3

Preparation of a binder resin according to the invention which is modified with a hydrocarbon resin, in addition to the natural resin.

The procedure is as in Example 1, with the modification that instead of 527 g of colophony, a mixture of 475 g of colophony and 52 g of a commercially available cyclopentadiene resin is employed. The resulting product has a softening point of 120° C. and an acid number of 14 mg of KOH/g of resin. The viscosity of a 35% strength solution in the mineral oil used above is 1480 dPa.s, and the viscosity of a 35% strength linseed oil solution is 2270 dPa.s. A solution of 1 part of resin in 3 parts of the mineral oil gives a stable, clear solution. This means that the compatibility of the resin is better than 1:3. The average molecular weight, determined by gel permeation chromatography, is 36,200 and the reaction time is 8 hours.

EXAMPLE 4

Preparation of a binder resin according to the invention which is modified with a drying vegetable oil, in addition to the natural resin.

The procedure is as in Example 1, with the modification that 44 g of soya oil are initially introduced into the reaction vessel in addition to the mixture of components. The resulting product has a softening point of 120° C. and an acid number of 22 mg of KOH/g of resin. The viscosity of a 35% strength solution in the mineral oil used above is 34 dPa.s, and the viscosity of a 35% strength linseed oil solution is 295 dPa.s. A solution of 1 part of resin in 10 parts of the mineral oil gives a stable, clear solution. This means that the compatibility of the resin is better than 1:10. The average molecular weight, determined by gel permeation chromatography, is 24,520 and the reaction time is 8 hours.

EXAMPLE 5

Preparation of a binder resin according to the invention which is modified with a non-drying vegetable oil, in addition to the natural resin.

653 g of Chinese colophony, 245 g of nonylphenol, 50 g of diphenylolpropane, 60 g of glycerol, 84 g of formaldehyde, 100 g of hydrogenated coconut fat and 10 g of magnesium oxide are subjected to a condensation reaction analogously to Example 1. After a reaction time of 8 hours, 1075 g of solid resin of softening point 115° C. and acid number 20 are obtained. A 35% strength solution of the resin in mineral oil of boiling range 240° to 270° C. and aniline point 72° C. has a viscosity of 647 dPa.s, coupled with a compatibility of better than 1 part of resin per 5 parts of mineral oil.

EXAMPLE 6

Preparation of a binder resin according to the invention which is modified with a hydrocarbon resin and a vegetable oil, in addition to the natural resin.

The procedure is as in Example 1, with the modification that instead of 527 g of colophony, a mixture of 475 g of colophony and 52 g of a cyclopentadiene resin modified with natural resin, as well as 50 g of coconut fat are employed. The resulting product has a softening point of 115° C. and an acid number of 14 mg of KOH/g of resin. The viscosity of a 35% strength solution in the mineral oil used above is 1270 dPa.s, and the viscosity of a 35% strength linseed oil solution is 1840 dPa.s. A solution of 1 part of resin in 3 parts of the mineral oil gives a stable, clear solution. This means that the compatibility of the resin is better than 1:3. The average molecular weight, determined by gel permeation chromatography, is 25,300 and the reaction time is 8 hours.

EXAMPLE 7

Preparation of a binder resin according to the invention using tall resin as the natural resin component and pentaerythritol as the esterifying agent.

527 g of American tall resin, 237 g of nonylphenol, 20 g of diphenylolpropane, 54 g of pentaerythritol, 68 g of paraformaldehyde and 6 g of magnesium oxide are reacted analogously to Example 1 but at an esterifying temperature of 260 instead of 250° C. The resulting resin has a melting point of 130° C. and an acid number of 22 mg of KOH/g of resin. A 35% strength solution of the resin in the mineral oil described above has a viscosity of 40 dPa.s. The compatibility is better than 1 part of resin per 10 parts by weight of mineral oil. The reaction time for its preparation is 9 hours.

EXAMPLE 8

Preparation of a binder resin according to the invention, the resol formation from the phenol and the aldehyde component being carried out under pressure.

A 6 l metal apparatus is charged with 2020 g of molten colophony, 967 g of nonylphenol, 46 g of diphenylolpropane, 184 g of glycerol, 23 g of magnesium oxide and 260 g of paraformaldehyde. The apparatus is then sealed pressure-tightly and the reaction mixture is heated to 140° C., while stirring. During this operation, a pressure of 2 bar is established. After condensation for 2 hours, the mixture is let down to normal pressure. It is then heated to 200° C., during which volatile fractions are distilled off. When 200° C. is reached, the apparatus is combined with a water separator, the internal temperature is adjusted to 250° C. and volatile fractions are distilled off azeotropically with xylene. When an acid number of 25 mg of KOH/g of resin is reached, the entraining agent is distilled off, initially under normal pressure, and residual volatile components are then removed under a pressure of 50 mbar. 175 g of a high-boiling mineral oil of boiling point 260° to 290° C. are stirred into the resin melt in order to reduce the high melt viscosity. After a reaction time of 8 hours, the reaction has ended and the apparatus is emptied.

The resin has a softening point of 140° C. and an acid number of 23 mg of KOH/g of resin. The viscosity of a 35% strength solution in linseed oil is 1652 dPa.s, and the viscosity of a 35% strength solution in mineral oil of boiling range 240° to 270° C. is 944 dPa.s. A solution of 1 part of resin in 5 parts of the above mineral oil is stable at 23° C.

EXAMPLE 9

Preparation of an ink for offset printing
A printing ink was prepared from
35 g of binder resin of Example 1
16 g of permanent ruby pigment
5 g of long-oil alkyd resin
44 g of mineral oil of boiling point 260° to 290° C.
by customary processes, and was used for printing paper by the offset process. This pasty ink showed very good printing properties. In particular, it had very good ink transfer properties, which led to a very good print sharpness and rapidly drying prints of high gloss. The abrasion resistance was adequate.

EXAMPLE 10

Preparation of an ink for illustration gravure printing with gasoline
An ink for illustration gravure printing with gasoline was prepared by customary processes from
25 g of binder resin of Example 2
9 g of permanent yellow pigment
66 g of gasoline of boiling range 110° to 130° C.
and was used for printing paper in the gravure printing process. This liquid ink showed good printing properties and gave rapidly drying prints of good gloss.

I claim:

1. A phenolic-resin-modified natural resin acid ester composition prepared by reacting at least one compound of each of the groups comprising A) 20 to 80% by weight of natural resins or natural acid resins
B) 10 to 45% by weight of mononuclear or polynuclear phenols,
C) 2 to 20% by weight of aldehydes or aldehyde acetals and
D) 1 to 20% by weight of aliphatic, cycloaliphatic or araliphatic alcohols having at least two hydroxyl groups, in the presence of
E) 0.1 to 2% by weight of magnesium compounds calculated as MgO and optionally compounds selected from the groups consisting of
F) fatty acids, fatty oils or fats and
G) ethylenically unsaturated hydrocarbon resins,
at temperature of 100° to 250° C. and subsequent azeotropic removal of water by distillation by means of an entraining agent at 200° to 300° C., the weight percentage being based on the total weight of the composition.

2. The resin acid ester composition of claim 1 containing 30 to 75% by weight of group A), 2 to 20% by weight of group C), and 1 to 25% by weight of group G).

3. A process for preparing the phenolic-resin-modified natural resin acid ester composition of claim 1 by reacting
20 to 80% by weight of natural resins or natural resin acids from group A),
10 to 45% by weight of phenolic compounds from group B),
2 to 20% by weight of aldehyde compounds from group C),
or, instead of the compounds from groups B) and C) or as a proportion with the compounds from groups B) and C), condensation products in a phenol-resol form prepared separately from compounds of groups B) and C),
1 to 20% by weight of polyol compounds from group D),
0.01 to 2% by weight, calculated as MgO, of magnesium compounds from group E),
0 to 30% by weight of fatty acid, fatty oils and fats from group F),
0 to 30% by weight of a hydrocarbon resin from group G), together with
0.01 to 20% by weight of an inert entraining agent, the weight percentages based on the total amount of the compounds employed.

4. A binder for printing inks comprising 1 to 99 parts by weight of the resin acid ester compositin of claim 1 and 99 to 1 parts by weight of a mineral oil.

5. The binder of claim 4 also containing an additive selected from the group consisting of colophony, colophony esters, vegetable oils and alkyd resins, phenolic resins, polystyrene and mixtures thereof.

6. A printing ink for offset printing and letter press printing containing as a binder resin the resin acid ester composition of claim 1.

* * * * *